June 24, 1947. C. L. TAYLOR 2,422,864
PUMP LUBRICANT METERING ARRANGEMENT
Filed Nov. 15, 1943
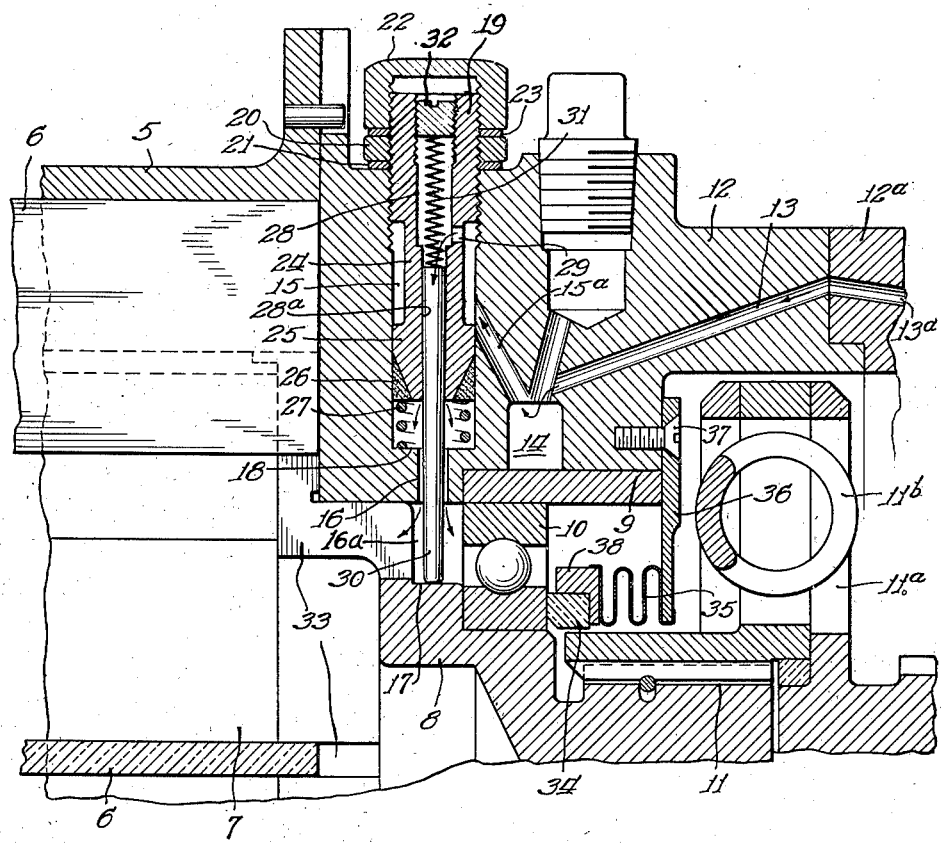
Inventor:
Clarence L. Taylor
By Edward C. Fitzbaugh
Atty.

Patented June 24, 1947

2,422,864

UNITED STATES PATENT OFFICE 2,422,864

PUMP LUBRICANT METERING ARRANGEMENT

Clarence L. Taylor, East Cleveland, Ohio, assignor, by mesne assignments, to Borg-Warner Corporation, Chicago, Ill., a corporation of Illinois Application November 15, 1943, Serial No. 510,331

5 Claims. (Cl. 184—6)

The present invention relates generally to lubricating devices for fluid displacement apparatus such as an air pump. These improvements have particular reference to an arrangement of this character that is especially applicable to a vacuum pump for the purpose of effecting a definite metering of the lubricant that is fed to the several parts of the pump.

It is one of the principal objects of this invention to simplify the construction of a lubricant metering arrangement such as contemplated herein, and to improve the efficiency and operation of such device.

In the present arrangement, the metering passageway is preferably in the form of a clearance that is established between a metering pin and a sleeve that surrounds said pin, and means are provided for vibrating the metering pin to insure the flow of lubricant and also to remove from the passageway any extraneous matter that might become lodged therein and tend to clog the same or interfere with the proper flow of the lubricant.

It is another object of the present invention to provide means for adjusting the size of the metering passageway. This is readily accomplished by a longitudinal adjustment of the sleeve to vary the clearance between it and the metering pin to thereby effect a predetermined flow of the lubricant. In this manner, the oil metering rate of a pump may be adjusted to the precise value that may be desired in a particular installation. For the purpose of facilitating this adjustment, the metering pin is provided with an elongate taper and the surrounding sleeve has a correspondingly tapered bore so that the longitudinal adjustment of the sleeve with respect to the metering pin will vary the clearance between these elements.

The present invention aims to provide a lubricant metering arrangement for an air pump wherein exterior pipes or lines are eliminated by incorporating provisions for feeding the lubricant through the pump housing direct from the oil pressure system of an engine that drives the pump.

While the present subject matter is particularly applicable to an air pump and the like, the improvements herein contemplated are, in their broadest aspect, capable of cooperative assembly with other types of apparatus.

Additional objects, aims, and advantages of the present invention will be apparent to those skilled in the art after the construction and operation of the pump lubricant metering arrangement is understood from the within description.

It is preferred to accomplish the numerous objects of this invention and to practice the same in substantially the manner hereinafter fully described and as more particularly pointed out in the appended claims, reference being made to the accompanying drawing that forms a part of this specification.

The drawing is a longitudinal vertical section taken axially through the lubricant metering arrangement showing the same incorporated in an air pump, portions of the pump assembly being shown in fragmentary section.

The drawing is to be understood as being more or less of a schematic character for the purpose of disclosing a typical or preferred form of the improvements contemplated herein.

The arrangement disclosed herein comprises a housing 5, a fragmental portion of which is shown, that provides a pump chamber for the rotor which embodies pump blades 6 and their rotatable carrier or rotor 7. A hub 8 of the rotor is journaled in a bearing 9 in the housing, with ball-bearings 10 interposed between these parts, and there is a splined coupling 11 projecting axially from the hub for interlocking attachment with suitable driving members 11a which connect the rotor to a prime mover such as an engine. A coil compression spring 11b may be included for absorbing shock.

The casing 12a of the engine contains the usual engine pressure oil for lubricating the moving parts of the engine. The housing 5 has an anchoring flange 12 that is bolted or otherwise secured to the engine casing 12a and oil feed inlet ducts 13 in said flange communicate through feed ducts 13a with the interior of the engine casing to receive the pressure oil therefrom and deliver this lubricant to an annular chamber 14 in the housing flange 12. It is from this chamber that the oil is metered to the moving parts of the pump to lubricate the same.

The means for accomplishing the metering function comprise a metering chamber 15 in the housing hub that is disposed with its axis radial to the axis of the rotor hub 8 and communication between said metering chamber 15 and the annular chamber 14 is established by a duct 15a. At its inner end this metering chamber 15 has a reduced portion 16 defining a lubricant discharge port that is open at its inner end opposite an annular shoulder or land 17 on the adjacent portion of the hub 8 of the rotor. This reduction of the bore of the metering chamber provides a transverse seat 18 near the lower or inner end of the metering chamber and it also provides an outlet port for the metering discharge of the lubricant in the manner later to be described herein. Screw threads are formed at the other or outer end of the metering chamber to receive the threaded outer end of a hollow adjustable sleeve 19 that is screwed into the metering chamber so that its outer end projects out of the chamber 15 and beyond the housing as shown. A lock nut 20 is screwed onto the protruding portion of the sleeve 19 and clamps against a sealing gasket 21, and a cap nut 22 fitting over the end of the sleeve 19 is screwed onto the latter to clamp a sealing gasket 23 against the outer face of the lock nut 20.

The intermediate or central portion of the metering sleeve 19 has a reduced neck 24, and the lower or inner end of the sleeve has a tapered or frusto-conical shape as indicated at 25 to engage a suitably shaped gasket 26 into which said tapered portion 25 is adapted to wedge to seal the clearance between the lower portion of the sleeve and the inner surface of the metering chamber 15. In order to maintain the gasket 26 in sealed engagement with the sleeve a spring 27 is interposed between the seat 18 and the end of the gasket. The sleeve 19 has a central bore 28 extending throughout its length and in the neck portion 24 of the sleeve there is a lateral aperture 29 that establishes communication between the bore of the sleeve and the metering chamber 15 to permit the lubricant to enter the sleeve.

Below the aperture 29 the bore 28 of the sleeve has a tapered portion 28a that converges towards the lower end of the sleeve, the said tapered portion of the bore providing a guide for a correspondingly tapered elongate metering pin 30 that has a somewhat loose fit in the sleeve bore. At its lower end the pin 30 passes out of the metering chamber 15, preferably through the lubricant discharge port 16, and its end engages the shoulder or land 17 hereinbefore mentioned. It will be understood that the pin 30 may alternatively contact another portion of a rotatably movable member of the structure to be lubricated. A flexible element, such as a spring 31, presses against the inner end of the metering pin 30 to urge it into contact with the land 17 or other moving part, and the tension of the spring is adjusted by means of a threaded plug 32 that is screwed into a threaded outer portion of the sleeve bore 28.

The lubricant that is delivered to the lubricant chamber 14 from the pressure oil portion of the engine, passes through duct 15a to the portion of the metering chamber 15 surrounding the neck of the sleeve 19, and thence through aperture 29 into the bore 28a of the sleeve above the metering pin 30. Due to vibratory motion of the metering pin, by reason of its contact with a rotating portion of the pump assembly, a certain amount of clearance is effected between said pin and the bore of the sleeve. This clearance is sufficient to permit seepage of the lubricant past the sleeve and out of the metering chamber through the lubricant discharge port 16. The lubricant will thus be delivered to an adjacent surface of the rotor or other moving member of the apparatus that is to be lubricated where centrifugal action will cause the oil to travel outwardly and flow into the guide slots 33 which carry the blades 6 of the rotor. The tolerance between these proximate portions will allow the oil to reach the interior of the housing. The action of centrifugal force then causes the lubricant to flow outwardly through the clearance between the blades and their slots in the rotor so that all the moving parts of the pump will be lubricated. In order to insure a definite passage of the oil past the proximate portions of the rotor and housing, the slots 33 for the blades extend in an axial direction from rotor body 7 and communicate with the annular space 16a along side ball bearing 10 and radially inward from port 16. The quantity of lubricant discharged from the metering chamber is definitely predetermined and controlled by longitudinally adjusting the metering sleeve 19 with respect to the metering pin 30 to increase or diminish the clearance between the tapered work faces of the pin and the bore of the sleeve, thus adapting the oil metering rate to the precise value that may be desired in a particular installation. At the same time the vibratory action of the pin will prevent clogging of the seepage passageway between the pin and the sleeve. An oil seal ring 34 of fiber or other suitable material is maintained in contact with the inner retainer ring of ball-bearing 10 by means of an elastic bellows 35 anchored to the adjacent portion of the housing flange 12 through the instrumentality of an annular carrier 36, the latter being attached to the flange by screws 37. The seal ring is conveniently mounted on the bellows by means of an annular recessed holder 38 to which the end of the bellows is attached. This arrangement performs the function of a retainer to prevent the lubricant passing out of or beyond the flange 12.

While this invention has been described in detail in its present preferred form of embodiment, it will be apparent to those skilled in the art, after understanding the improvements, that various changes and modifications may be made therein without departing from the spirit or scope thereof. It is aimed in the appended claims to cover all such changes and modifications.

I claim:

1. A lubricant metering arrangement embodying a housing, a metering chamber in said housing, means for supplying lubricant to said chamber, a hollow sleeve adjustably mounted in said metering chamber, means placing said metering chamber in communication with a rotatable member in said housing, a vibratory metering pin in the bore of said sleeve with a protruding portion extending into contact with an annular portion of the rotatable member to effect vibration of said metering pin, and elastic means urging said metering pin into engagement with the annular portion of the rotatable member.

2. A lubricant metering arrangement as defined in claim 1, wherein the bore of the sleeve and the metering pin have correspondingly tapered work faces.

3. A lubricant metering arrangement embodying a housing, an annular lubricant chamber surrounding a rotatable member in said housing, a metering chamber communicating with said lubricant chamber, a hollow sleeve adjustably mounted in said metering chamber, a discharge port in said housing between said metering chamber and an annular portion of the rotatable member, a metering pin in the bore of said sleeve having its inner end projected through said discharge port into contact with the annular portion of the rotatable member to effect vibration of said metering pin, and elastic means urging said metering pin into engagement with the annular portion of the rotatable member.

4. A lubricant metering arrangement as defined in claim 3, wherein the bore of the sleeve and the metering pin have correspondingly tapered work faces.

5. An arrangement for lubricating a rotary element comprising means defining an annular lubricant chamber and a lubricant metering device, said device comprising an adjustable hollow sleeve, means establishing communication between said sleeve and said lubricant chamber, a vibratory metering pin in the bore of said sleeve, there being a variable passageway between said pin and said sleeve, and means on said rotary element for engaging and vibrating said pin whereby to effect the variability of said passageway.

CLARENCE L. TAYLOR.

REFERENCES CITED

The following references are of record in the file of this patent:

UNITED STATES PATENTS

| Number | Name | Date |
|---|---|---|
| 795,230 | Malmborg | July 18, 1905 |
| 848,446 | Crowell | Mar. 26, 1907 |
| 2,068,803 | Johnson | Jan. 26, 1937 |
| 2,243,898 | Fulcher | June 3, 1941 |
| 901,039 | Rank | Oct. 13, 1908 |
| 367,311 | Miller | July 26, 1887 |

FOREIGN PATENTS

| Number | Country | Date |
|---|---|---|
| 1,380 | Austria | Feb. 1, 1900 |
| 163,714 | Germany | Nov. 27, 1904 |